United States Patent [19]
Kozaki

[11] Patent Number: 5,666,240
[45] Date of Patent: Sep. 9, 1997

[54] MAGNETIC HEAD ASSEMBLY FOR TEMPORARILY HOLDING MAGNETIC HEAD MEMBERS

[75] Inventor: Masahiro Kozaki, Kawasaki, Japan

[73] Assignee: Fujitsu Limited, Kawasaki, Japan

[21] Appl. No.: 271,764

[22] Filed: Jul. 7, 1994

Related U.S. Application Data

[62] Division of Ser. No. 8,007, Jan. 22, 1993, Pat. No. 5,388,324.

[30] Foreign Application Priority Data

Jan. 22, 1992 [JP] Japan .................. 4-008955

[51] Int. Cl.$^6$ ............................................. G11B 5/18
[52] U.S. Cl. ............................................. 360/104
[58] Field of Search ...................... 360/104–106, 360/126

[56] References Cited

U.S. PATENT DOCUMENTS

| | | | |
|---|---|---|---|
| 5,016,131 | 5/1991 | Riggle et al. | 360/106 |
| 5,041,932 | 8/1991 | Hamilton | 360/104 |
| 5,099,373 | 3/1992 | Shibata et al. | 360/106 |
| 5,146,450 | 9/1992 | Brooks et al. | 360/105 |

Primary Examiner—Stuart S. Levy
Assistant Examiner—David D. Davis
Attorney, Agent, or Firm—Greer, Burns & Crain, Ltd.

[57] ABSTRACT

A magnetic head assembly for an elongated integral type magnetic head. The assembly includes a plurality of elongated integral magnetic head bodies formed on a substrate. The head bodies are formed as a first block and a second block, where each block has a comb-shape and includes a connection part that carries a plurality of the magnetic head bodies. The head bodies extend parallel to each other such that the magnetic head bodies held on the comb-shaped first block and the magnetic head bodies held on the comb-shaped second block mesh with each other. The first and second block are separated from each other by applying a selective removal process for removing a strip-like boundary region formed to surround each of the first and Second blocks by an etching process. Each magnetic head member is separable from each other for mounting in a magnetic disk device.

10 Claims, 13 Drawing Sheets

MAGNETIC HEAD ASSEMBLY FOR TEMPORARILY HOLDING MAGNETIC HEAD MEMBERS

This is a division, of application Ser. No. 08/008,007, filed Jan. 22, 1993 now U.S. Pat. No. 5,388,324.

BACKGROUND OF THE INVENTION

The present invention generally relates to magnetic information storage devices and more particularly to a fabrication process of an integral thin-film magnetic head for use in a compact magnetic information storage device that records and reproduces information signals on and from a rigid magnetic disk that is revolved at a high speed in a hermetically sealed environment.

In the magnetic information storage devices of the so-called hard disk, a rigid magnetic disk revolving at a high speed such as several thousand r.p.m. is used for a recording medium, and recording and reproduction of information signals are achieved on and from the magnetic disk by means of a magnetic head that scans the surface of the magnetic disk without establishing contact therewith. The conventional hard disk device having a construction as such generally provides a very high access speed in the order of ten milliseconds or less and is used extensively as the auxiliary storage devices of computers and microprocessors. On the other hand, the conventional hard disk device occupies a considerable space mainly due to the size of the floating magnetic head and the space in which the magnetic head moves, and there exists a substantial difficulty in the reduction in the size of the device. Further, such a conventional hard disk device that uses a floating magnetic head is vulnerable to external shock.

On the other hand, there is proposed a new type of hard disk device that uses a very small, needle-like magnetic head that contacts with the surface of the revolving magnetic disk as shown in FIG. 1.

Referring to FIG. 1, the hard disk device is constructed on a base body 10 that defines a hermetically sealed space therein together with another base body part not illustrated. In the hermetically sealed space formed as such, there is provided a chassis 11 on which a shaft 12 is fixed. Further, the chassis 11 carries thereon a motor not illustrated in FIG. 1 and the motor drives a stage 13a such that the stage 13a revolves about the shaft 12 at a high speed typically in the order of several thousand r.p.m.

The stage 13a thus driven by the motor carries thereon one or more magnetic disks 13 wherein the magnetic disk 13 is formed of a rigid material such as aluminum and carries a magnetic coating. Further, a magnetic head assembly 14 is provided on the base body 10, wherein the magnetic head assembly 14 includes a shaft 16 that is fixed on the base body 10, and an arm 15 is mounted on the shaft 16 such that the arm 15 swings freely about the shaft 16. The arm 15 carries at a free end thereof a needle-like magnetic head member 17 that is urged to establish a continuous contact to the surface of the disk 13, typically with an urging force of about 1 mg. Further, the arm 15 is driven by an electromagnetic actuator 18 provided on the base body 10, and the needle-like magnetic head member 17 at the free end of the arm 15 scans the surface of the magnetic disk 13 in a radial direction thereof in response to the swinging motion of the arm 15.

It should be noted that the magnetic head member 17 carries a magnetic head at a top end thereof, and the information signal picked up at the magnetic head part is transferred to a terminal pad 20 on the base body 10 via a flexible cable 19. Further, the flexible cable is used for supplying an electric power for actuating the arm 15. When recording information, on the other hand, the information signal is supplied to the magnetic head part from the terminal pad 20 via the flexible cable 19 for causing a magnetization of the magnetic disk 13 in response to the information signal.

FIG. 2 shows the arm 15 and the magnetic head member 17 attached thereto in more detail, wherein the arm 15 is formed of a resilient material such as aluminum and the magnetic head member 17 is attached to the arm 15 by an adhesive. Further, it will be noted that the arm 15 is formed with a U-shaped part in correspondence to a part that is mounted on the magnetic head assembly 14.

FIG. 3 shows the arm 15 and the head member 17 of FIG. 2 in the assembled state, wherein the arm 15 is mounted on a rotary sleeve 14a that in turn is fitted upon the shaft 16 shown in FIG. 1 such that the sleeve 14a can rotate freely about the shaft 16. The sleeve 14a carries a frame 14b that in turn carries a coil thereon, and the coil on the frame 14b is driven, with respect to a stator in the electromagnetic actuator 18, in response to a drive current that is supplied via the flexible flat cable 19. Thereby, the arm 15 experiences a swinging motion in response to the energization of the actuator 18.

FIG. 4 shows the cross sectional view of the hard disk device of FIG. 1, wherein only essential part will be described.

Referring to FIG. 4, it will be noted that the base body 10 carries a motor M such that the motor M surrounds the shaft 12, and a rotor 13a is provided to surround the motor M. There, the rotor 13a is held rotatable about the shaft 12 by a bearing 13b and is driven upon energization of the motor M. The magnetic disk 13 is fixed upon the rotor 13a and revolves unitarily with the rotor 13a about the shaft 12. In the illustrated example, two magnetic disks are provided parallel about the common shaft 12. Further, it will be understood that the sleeve 14a is held rotatable about the shaft 16 by a bearing 14c. The electromagnetic actuator 18 includes stator magnets that are disposed above and below the frame 14b.

In FIG. 4, it is important to note that the needle-like magnetic head member 17 establishes a contact engagement with the surface of the magnetic disk 13. As already mentioned, the arm 15 resiliently urges the head member 17 upon the magnetic disk 13, and the recording and reproduction of information signals is achieved in the state that the head member 17 maintains the contact engagement with the surface of the revolving magnetic disk 13. By using the needle-like magnetic head member 17, one can reduce the space occupied by the magnetic head in the hard disk device, and the number of the magnetic disks that are mounted on the common shaft can be increased. Alternatively, One can reduce the height of the hard disk device.

FIG. 5 shows another conventional example of the magnetic head assembly used in the hard disk device of the foregoing type, wherein the magnetic head assembly is designated by a numeral 24 and includes a swing arm 25 adapted to be mounted on the rotary sleeve 14a at a circular cutout 25a and has flat upper and lower major surfaces extending straight in the radial direction of the arm 25. There, the arm 25 carries on either of the upper major surface or lower major surface an intermediate member 25 in correspondence to the free end of the arm 25, and the intermediate member 25 is formed with a mount surface 27a at a distal end thereof for carrying the integral thin film magnetic head body 17.

FIG. 6 shows the side view of the magnetic head assembly 24, wherein it will be noted that the mount surface 27a is formed to extend obliquely and the magnetic head body 17 carried thereon establishes a contact engagement with the magnetic disk 13 with an optimized contact angle. Typically, the magnetic head body 17 is attached to the surface 27a by an adhesive or welding. Further, the intermediate member 27 is provided at the free end of the arm 25 by a slider part 27b that engages with a guide groove 27c formed at the free end part of the arm 25 for minute adjustment. After the slider part 27b is adjusted with respect to the proper contact angle, the member 27 is fixed upon the arm 25 by an adhesive such as epoxy or by welding.

FIG. 7 shows the integral magnetic head member 17 in an enlarged scale.

Referring to FIG. 7, it will be noted that the magnetic head member 17 includes an integral head body 17a that carries a magnetic head at a head portion 17b that in turn is defined in correspondence to the tip end of the head body 17a, while the root end part of the body 17a located at the opposite side is adapted for mounting on the mount surface 27a of the member 27. The head portion 17b includes therein a thin film magnetic head of which construction is shown in the enlarged cross sectional view of FIG. 8.

Referring to FIG. 8, the head portion 17b includes a magnetic yoke $17_1$ embedded in aluminum oxide that forms the integral magnetic head body 17a, wherein the magnetic yoke $17_1$ includes an upper yoke $17_2$ and a lower yoke $17_3$, and a main yoke $17_4$ is formed at the front end part of the head portion 17b in continuation with the upper yoke $17_2$. Thereby, a gap $17_5$ is formed between the yoke $17_4$ and the yoke $17_3$, and a coil $17_6$ is wound around the upper yoke $17_2$. Further, in correspondence to the gap $17_5$, the magnetic head body is formed with a contact surface $17_7$ for establishing a contact with the surface of the magnetic disk, and the magnetic flux penetrates into the magnetic coating on the disk 13 in correspondence to the gap $17_5$. Further, a conductor strip $17_9$ extends from the coil $17_6$ along the body 17a to a terminal pad $17_8$ that is provided at the root part of the magnetic head body 17a.

FIG. 9 shows the magnetic head body 17 of FIG. 8 in a plan view.

Referring to FIG. 9, it can be seen that the magnetic yoke $17_2$ extends in the longitudinal direction of the head body 17 and the coil $17_6$ is wound around the yoke $17_2$. Further, respective ends of the coil $17_6$ are connected to lead conductors $17_{9a}$, $17_{9b}$ that in turn are connected to terminal pads $17_{8a}$ and $17_{8b}$ respectively, wherein the lead conductors $17_{9a}$, $17_{9b}$ correspond to the lead conductor $17_9$ while the terminal pads $17_{8a}$ and $17_{8b}$ correspond to the terminal pad $17_8$.

The fabrication process for fabricating the integral thin film magnetic head of FIG. 9 is disclosed in the U.S. Pat. No. 5,041,932 to Hamilton, op cit., and FIG. 10 shows the fabrication process of Hamilton. In the fabrication process, a number of the integral thin film magnetic heads are formed simultaneously on a substrate by repetitive deposition processes, and the magnetic heads thus formed are separated from each other by dissolving a separation region that defines individual magnetic heads by an etching process.

Referring to FIG. 10, the integral thin film magnetic head 17 is constructed on a silicon substrate 31 that has a principal surface on which an adhesion layer 32 of Ti and an electro-plating base 33 of a conductive material such as Cu are deposited successively for example by a sputtering process.

On the electro-plating base 33, a Cu layer 34 is deposited by an electro-plating process with a thickness of 5–25 µm, and a photoresist (not shown) is applied on the layer 34 thus formed after smoothing the surface thereof. The photoresist is patterned subsequently to form a mask pattern that exposes selectively the surface of the layer 34 in correspondence to the separation region mentioned previously, and a copper stripe 37a is grown thereon by an electro-plating process. As will be described later with reference to FIG. 11, the separation region extends straight and surrounds each elongated magnetic head 11 laterally.

Next, the mask is removed and a new mask is formed to expose selectively the surface of the layer 64 in correspondence to the region wherein the terminal pads $17_{8a}$, $17_{8b}$ are to be formed, and a gold layer is deposited on the layer 64 in correspondence to the exposed surface thus formed with a thickness of 6–10 µm to form the foregoing pads $17_{8a}$ and $17_{8b}$. Next, the mask is removed and an adhesion layer 35 of Ti is grown on the entire surface of the structure followed by a deposition of Al$_2$O$_3$ to form a layer 36 by a sputtering process, wherein the layer 36 is grown with a thickness of 6–10 µm. Further, the resulting surface is lapped and polished until the copper strip 37a and the terminal pads $17_{8a}$, $17_{8b}$ are exposed.

On the planarized surface thus formed, a Ti adhesion layer 38 and a Cu electro-plating base 39 are deposited consecutively similarly to the previous process for forming the layers 32 and 33, and a mask (not shown) is formed thereon by depositing a photoresist and patterning the same subsequently. Further, by using the mask, a bottom part pattern $17_{5a}$ forming the bottom pattern of the coil $17_6$ as well as the lead conductor patterns $17_{9a}$, $17_{9b}$ are formed on the electro-plating base 39 by conducting an electroplating of Cu. Thereby, not only the Cu layers $17_{9a}$, $17_{9b}$ and $17_{6a}$ are formed as already mentioned but also a Cu layer 37b is formed on the base 39 in correspondence to the Cu stripe 37a. Thereby, the layer 37b increases the height of the Cu stripe 37. Further, the mask is removed and replaced by another mask that selectively exposes the surface of the Cu layer 37b as well as a part of the layer $17_{6a}$ on which a vertically extending pattern of the coil $17_6$ is to be formed, and an electro-plating of Cu is conducted to deposit a Cu layer simultaneously on the strip 37b and on the bottom pattern $17_{6a}$ to form a Cu strip 37c and a vertically extending pattern $17_{6b}$ of the coil $17_6$ as illustrated. Further, the mask is removed and Al$_2$O$_3$ is deposited to fill the depression formed on the structure as a result of the growth of the Cu strip 37c and the vertical coil pattern $17_{6b}$.

After the foregoing process, the surface of the structure thus obtained is lapped and polished to form a planarized surface, and a mask is formed to expose selectively the strip 37c, the pattern $17_{6b}$ and in addition a region on which the upper yoke $17_2$ is to be formed. Further, a Ti adhesion layer and an electro-plating base are deposited consecutively thereon similarly to before on the exposed surface, and an electro-plating deposition of Cu is conducted on the electro-plating base thus formed to form a strip pattern 37d of Cu as well as the upper yoke $17_2$. Further, a Cu pattern $17_{6c}$ is grown at both sides of the yoke $17_2$ simultaneously. Next, the mask is removed and replaced such that the yoke $17_2$ thus formed is covered, and the electro-plating of Cu is continued to form a strip pattern 37e on the strip pattern 37d and to form a vertical pattern $17_{6d}$ in continuation to the vertical pattern $17_{dc}$ of the coil $17_6$. Further, the mask is removed and the depression formed in the structure as a result of the growth of the Cu patterns above is filled by Al$_2$O$_3$.

Next, the structure thus formed is lapped and polished to form a planarized upper major surface, and a mask is provided to expose selectively the Cu strip pattern 37e and a region on which the lower pattern of the coil 17₆ is to be formed. Further, the Ti adhesive layer and the Cu electro-plating base are deposited similarly as before, and an electro-plating of Cu is conducted to form a strip pattern 37f and pattern 17₆ₑ that corresponds to the lower pattern of the coil 17₆. Further, the mask is replaced by a new mask that exposes selectively the layer 37f thus formed and in addition the part of the layer 17₆ₑ on which the bridging part of the yoke shown in FIG. 8 (the part bridging between the upper yoke 17₂ and the lower yoke 17₃) is to be formed, and an electro-plating process is conducted to form a Cu strip pattern 37g as well as the bridging part not illustrated in FIG. 10. After this, the mask is removed and the depression formed thereby is filled by Al₂O₃.

Next, the upper major surface of the structure thus formed is lapped and polished to form a planarized surface until the bridging part formed in the previous step and the strip pattern 37g are exposed, and a Ti adhesion layer and a Cu electroplating base are deposited consecutively on the exposed surface of the strip pattern 37g as well as on a region on which the lower yoke 17₃ is to be formed. Further, an electro-plating of Cu is conducted to form the lower yoke 17₃ as well as a strip pattern 37h. After this, the mask is replaced such that the pattern 17₃ is protected, and the electro-plating deposition of Cu is continued until a strip pattern 37i is grown while using a patterned resist as a mask. Further, the mask is removed and the depression formed as a result is filled by Al₂O₃, and the structure thus formed is subjected to an finishing process wherein the upper major surface of the structure is lapped and polished to have a planar surface. Finally, a deposition of Al₂O₃ is made in correspondence to the tip end of the head portion 17b, although not illustrated in FIG. 9.

FIG. 11 shows the structure thus obtained in a plan view, wherein a number of the elongated thin film integral magnetic heads are formed on the common substrate or wafer 31 in a parallel and mutually contacting relationship. There, it should be noted that the each elongated magnetic head 17 is laterally surrounded or defined by a Cu strip 37 that in turn is formed of the Cu strips 37a–37i stacked as already explained. There, the substrate 31 is scribe-cut into one or more plates 170 each including a number of the magnetic heads 17 aligned in one direction, and a deposition of the main yoke 17₄ is conducted upon the side edge of the plate 170 in correspondence to individual end surfaces of the magnetic head 17.

The plate thus processed is then subjected to an etching process wherein the plate is immersed in an etching bath that contains an etchant such as a mixture of H₂SO₄ and H₂O₂. There, the Cu strip 37 in the scribe-cut plate is selectively dissolved by the etchant, wherein the etchant acts further upon the Cu layer 34 at the interface between the substrate 31 and the magnetic head 17. Thereby, the magnetic heads 17 are separated from each other, and each magnetic head 17 is recovered and mounted on the arm 15 shown in FIG. 2 or on the surface 27a of the member 27 shown in FIG. 5.

In the foregoing fabrication process of the magnetic head 17, it will be easily noted that one needs to have a substantial skill for assembling the magnetic head upon the arm to form a magnetic head assembly. More specifically, one has to pick up the individual needle-like magnetic head and mount same upon the suitable arm such as the surface 27a of the member 27. It should be noted that each magnetic head 17 typically has a width of 0.5 mm, a height of 0.05 mm and a length of 8 mm. In addition, the major part of the integral magnetic head is formed of brittle and fragile Al₂O₃. Thus, the handling of the magnetic head has been extremely difficult.

SUMMARY OF THE INVENTION

Accordingly, it is a general object of the present invention to provide a novel and useful process for fabricating an integral, thin-film magnetic head wherein the foregoing problems are eliminated.

Another and more specific object of the present invention is to provide a process for fabricating an integral, thin-film magnetic head having an elongated form, such that the magnetic head is easy to handle when assembling a magnetic disk storage device.

Another object of the present invention is to provide a thin-film magnetic head assembly that includes a plurality of integral, thin film magnetic heads therein and is easy to handle when assembling a magnetic disk storage device.

Another object of the present invention is to provide a process for fabricating an integral, thin-film magnetic head, comprising the steps of: providing a separation layer on a surface of a substrate, said separation layer being formed of a material susceptible for a selective removal process; forming a plurality of integral thin-film magnetic heads on said separation layer such that each of said thin-film magnetic heads has an elongated form extending from a first end to a second, opposite end with a length substantially exceeding any of a width and a thickness of said thin-film magnetic head, each of said thin-film magnetic heads carrying a magnetic head at said first end; said step of forming said plurality of integral thin-film magnetic heads being achieved such that said plurality of integral thin-film magnetic heads are formed as a first block and a second block each having a comb-shape and including a plurality of thin-film magnetic heads connected with each other at said second end by a connection part with a mutual separation, each said mutual separation being set sufficiently large to accommodate a single thin film magnetic head therein; said first and second blocks being defined laterally by a strip-like region of a material that is susceptible to a selective removal process; said comb-shaped first block and said second block being disposed in a mutually opposing relationship such that said first end of said thin-film magnetic heads of said first block reaches said connection part of said second block and such that said first end of said thin-film magnetic heads of said second block reaches said connection part of said first block; and separating said first block and said second block by applying a selective removal process for removing said strip-like region and said separation layer.

Another object of the present invention is to provide a thin-film magnetic assembly, comprising: a plurality of elongated magnetic head members extending from a first end to a second, opposite end with a length that substantially exceeds any of a width and a height of said magnetic head, each of said elongated magnetic head members carrying a magnetic head at said first end; and a base member carrying thereon said plurality of elongated magnetic head members, said plurality of elongated magnetic head members extending parallel in a common direction and connected to said base member at said second end.

According to the present invention, one obtains the thin-film magnetic head in the form of the comb-shaped blocks that carry thereon a plurality of the elongated magnetic heads like a comb teeth. Thereby, handling of the magnetic head becomes substantially easier as compared with the conventional process that handles the elongated magnetic head individually.

Other objects and further features of the present invention will become apparent from the detailed description when read in conjunction with the attached drawings.

DETAILED DESCRIPTION OF THE PREFERRED EMBODIMENT

Figure 12A:
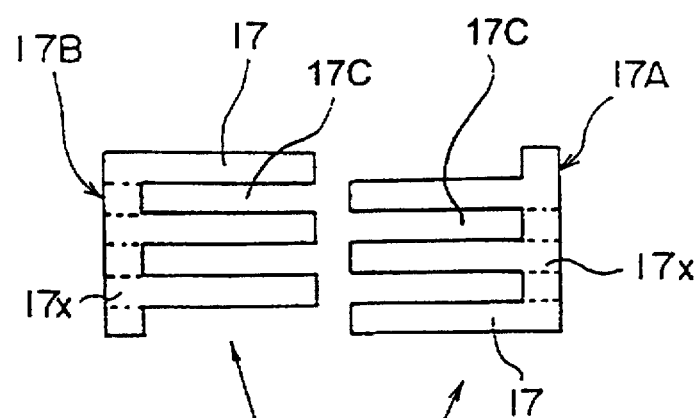
FIGS. 12(A) and 12(B) are diagrams showing the fabrication of the integral thin-film magnetic head according to a first embodiment of the present invention.
Figure 12B:
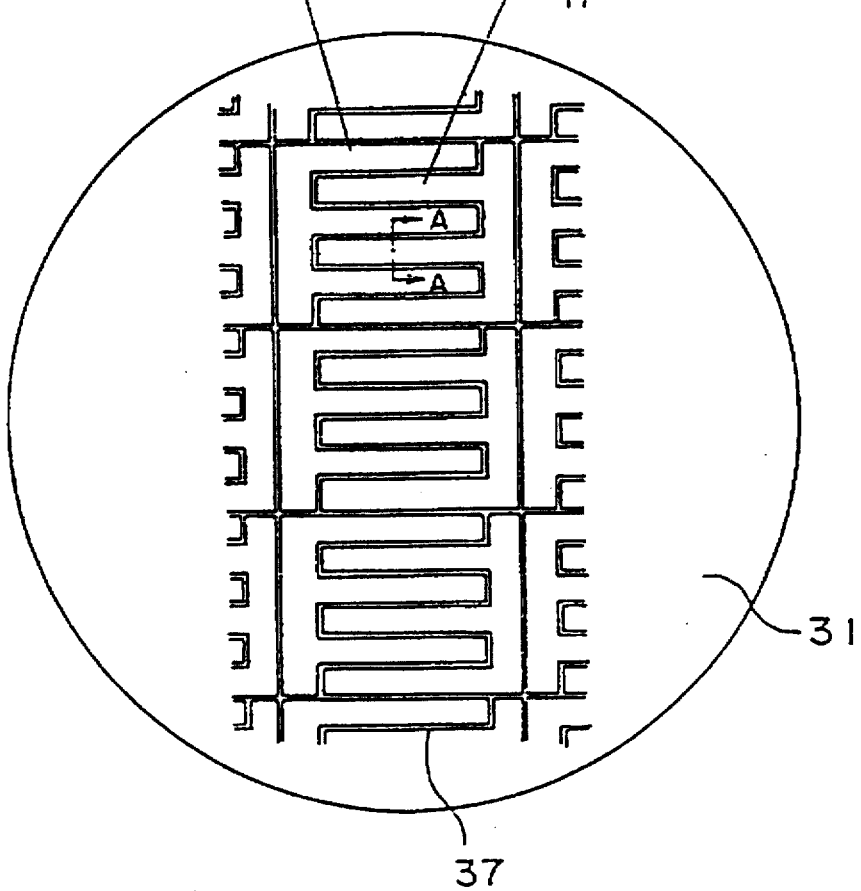

FIGS. 12(A) and 12(B) shows the essential feature of an embodiment according to the present invention. In the drawings, those parts that correspond to the parts described previously are designated by the same reference numerals and the description thereof will be omitted.

Referring to the drawings, it will be noted that the integral thin-film magnetic heads 17 are arranged to form comb-shaped members 17A and 17B wherein, in each of the comb-shaped members 17A and 17B, a number of the magnetic heads 17 are connected with each other by a laterally extending base part $17_x$. There, the comb-shaped member 17A and the comb-shaped member 17B are arranged to oppose with each other such that the magnetic heads 17 on the comb-shaped member extend toward a direction opposite to the direction in which the magnetic heads on the comb-shaped member 17A extend. More specifically, the tip end of each magnetic head 17 on the member 17A reaches the base part $17_x$ of the member 17B and the tip end of each magnetic head 17 on the member 17B reaches the base part $17_x$ of the member 17A.

Thereby, the members 17A and 17B are defined on the substrate 31 as indicted in FIG. 12(B), wherein it will be noted that the teeth (magnetic heads 17) of the comb-shaped member 17A and the teeth (magnetic heads 17) of the comb-shaped member 17B are meshed with each other in spaces 37C formed between adjacent magnetic heads 17 of comb shaped members 17A and 17B. Thereby, the surface of the substrate 31 is divided into a number of square block regions each includes one pair of the comb-shaped members 17A and 17B meshing each other.

Figure 10:
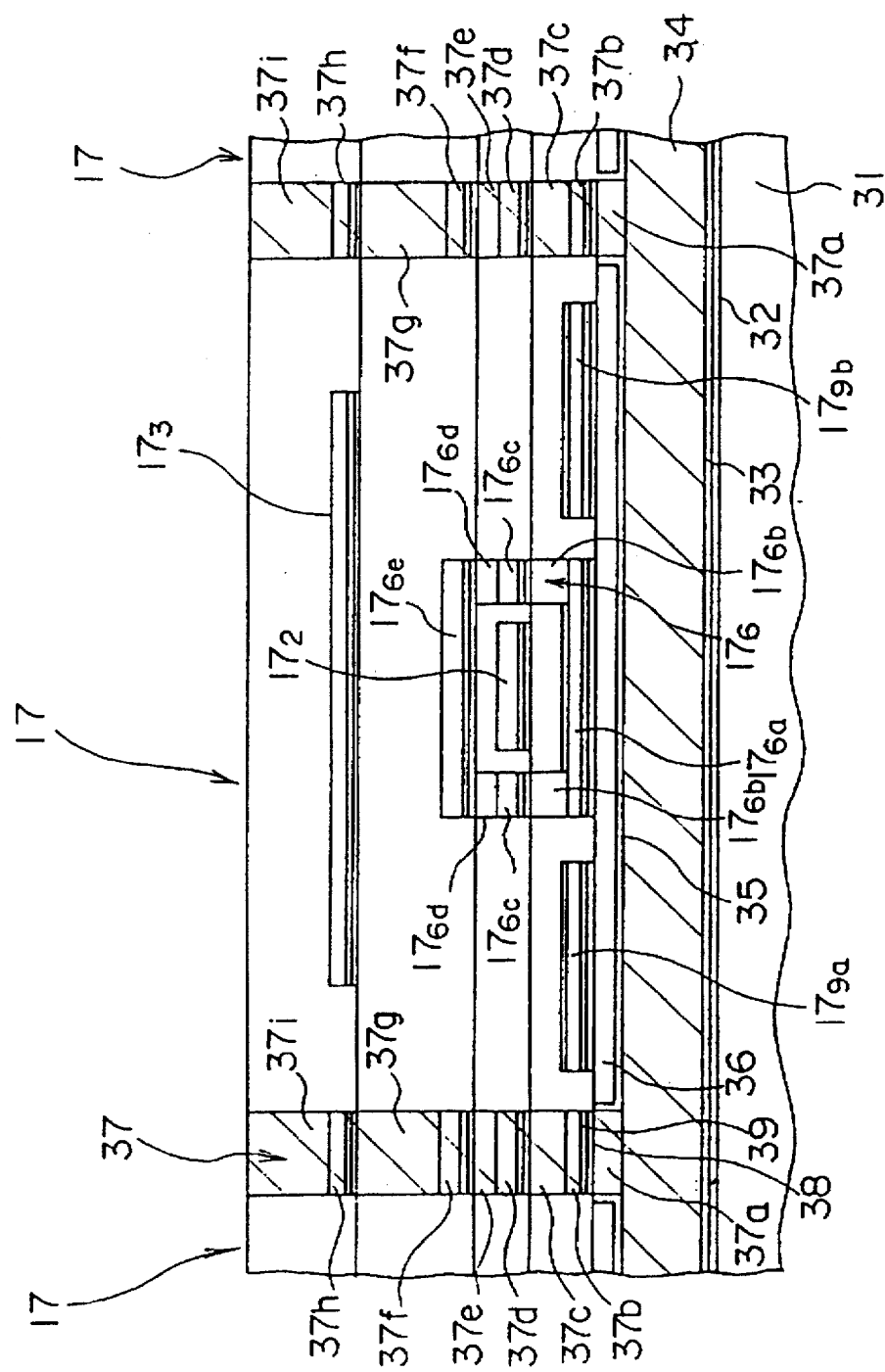
FIG. 10 is a diagram showing the transversal cross section of the magnetic head of FIG. 7.
Figure 11:
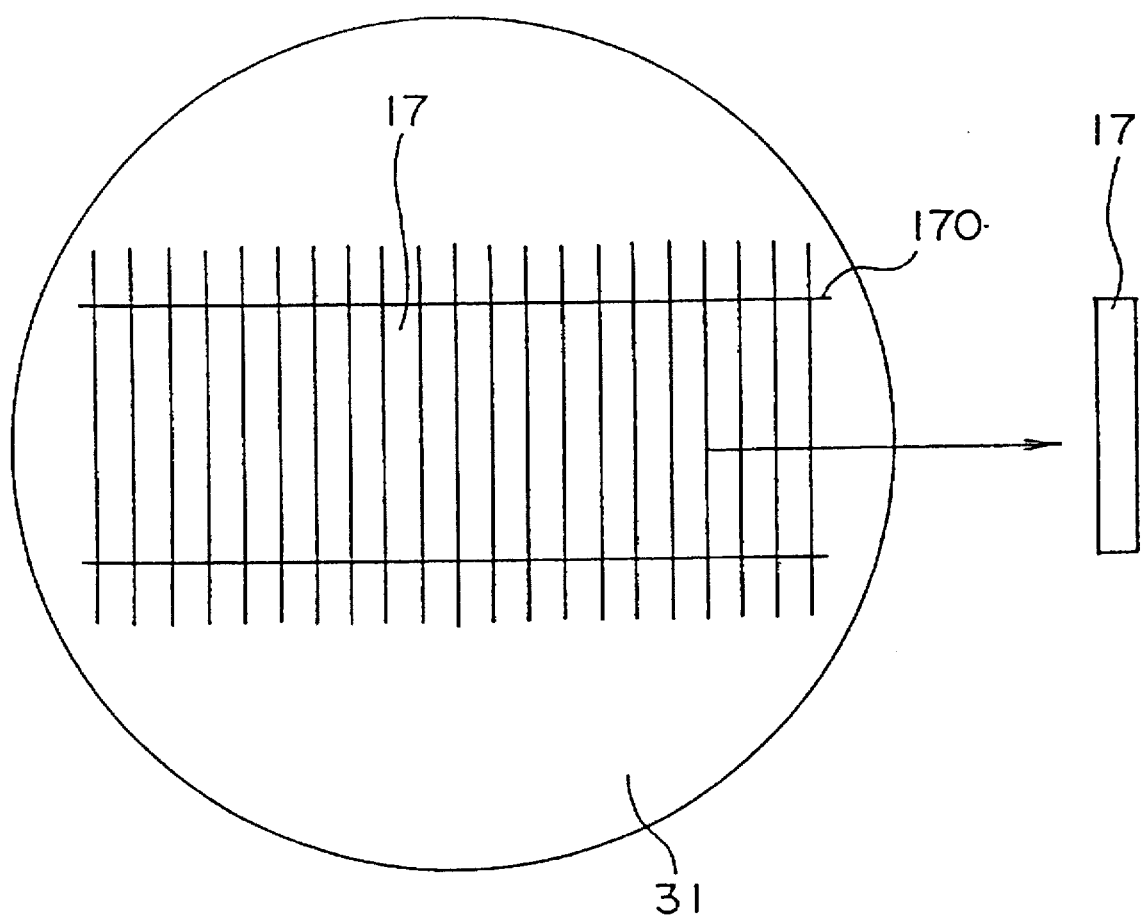
FIG. 11 is a diagram showing the arrangement of the integral thin-film magnetic heads on a wafer before the step of separating individual magnetic heads from each other.

In the present embodiment, the magnetic heads 17 are formed by a process similar to the process described with reference to FIG. 10, wherein it should be noted that the Cu strip 37 surrounds each of the comb-shaped members 17A and 17B rather than individual elongated magnetic heads 17. On the other hand, the comb-shaped members 17A and 17B are formed on the Cu separation layer 34 similarly to the conventional process.

Thus, by dipping the substrate 31 of FIG. 12(B) into an etching bath such as the foregoing mixture of $H_2SO_4$ and $H_2O_2$ for dissolving the Cu layer 34 as well as the Cu strip 37, one obtains individual comb-shaped members 17A and 17B as shown in FIG. 12(A), wherein a number of the small, needle-like magnetic heads 17 extend commonly from the base part $17_x$. Thereby, it will be noted that handling of the comb-shaped members thus formed is much easier than handling individual needle-like magnetic heads 17.

Figure 13A:
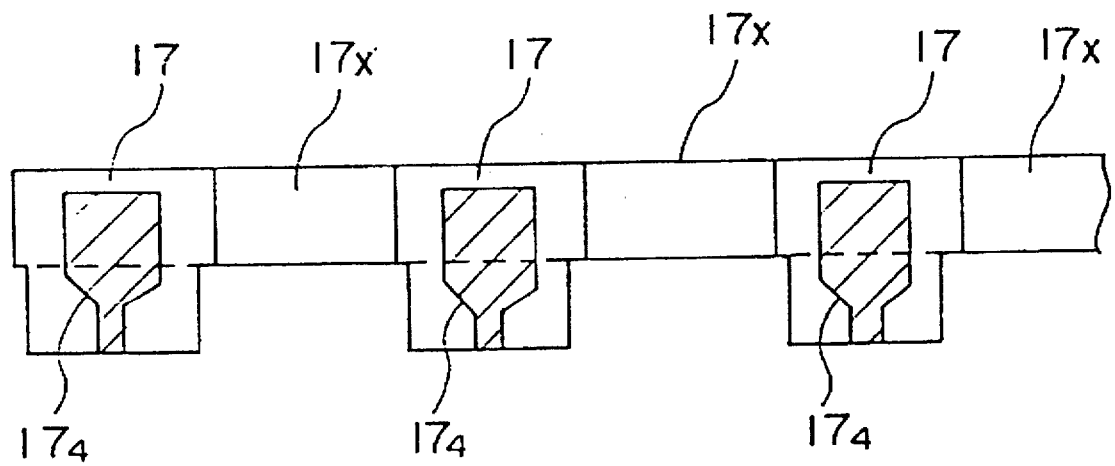
FIG. 13(A) generally depicts a combed shape member having a formed main yoke in accordance with the invention.
Figure 13B:
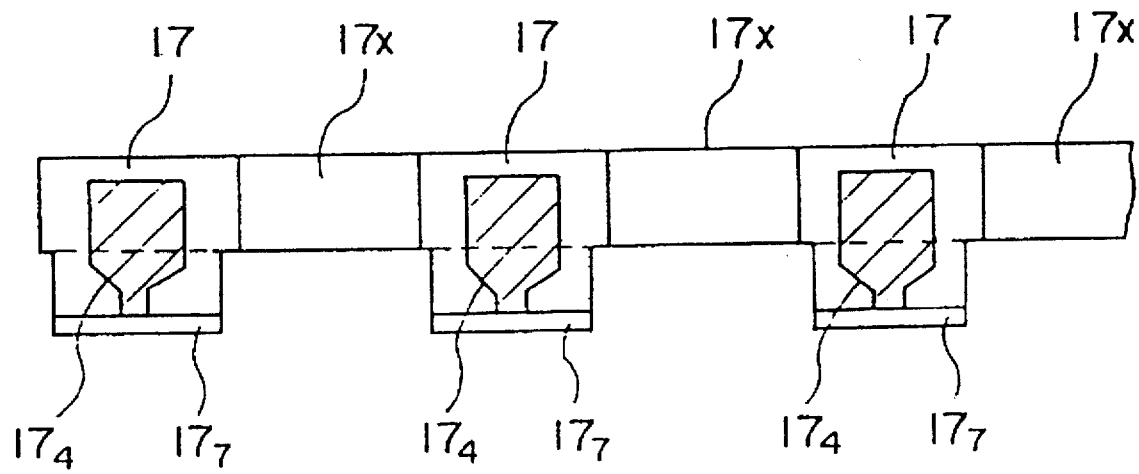
FIG. 13(B) generally depicts the combed shaped member of FIG. 13(A) having an oblique contact surface in accordance with the invention.

After the step of FIG. 12(A) for separating individual comb-shaped members 17A and 17B, the comb-shaped members thus formed are held on a jig and a deposition process for forming the main yoke $17_4$ is conducted on the end surface at the first end as shown in FIG. 13(A), wherein FIG. 13(A) is a view of the comb-shaped member 17A or 17B showing the first end surface of the magnetic heads 17. Further, after depositing a protective layer of $Al_2O_3$ on the main yoke $17_4$ thus formed, the comb-shaped member 17A or 17B is subjected to a lapping and polishing process to form the oblique contact surface $17_7$ as shown in FIG. 13(B).

Figure 1:
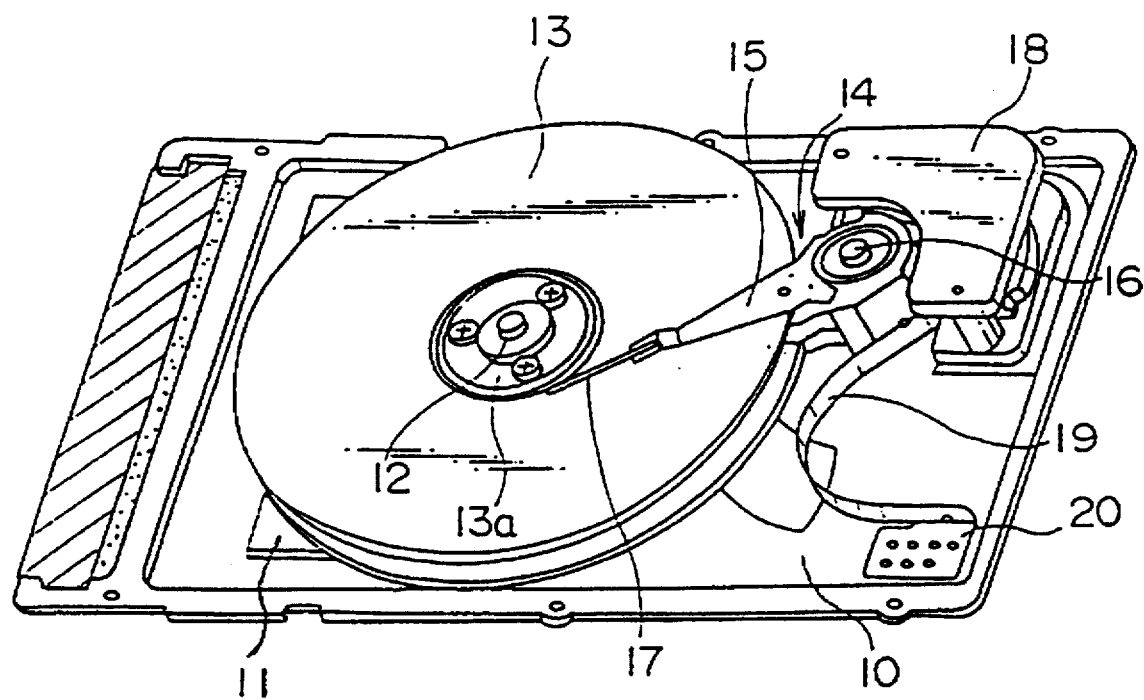
FIG. 1 is a diagram showing the construction of a conventional magnetic disk storage device that employs an integral thin-film magnetic head and to which the present invention is applicable.
Figure 2:
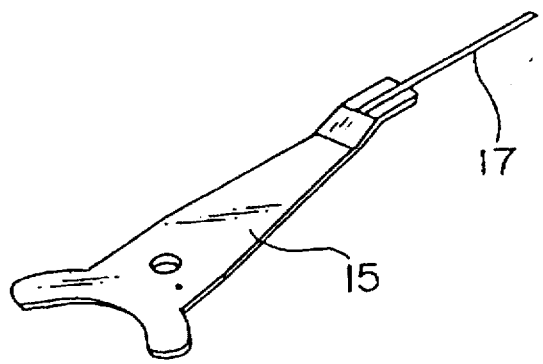
FIG. 2 is a diagram showing a swing arm used in the device of FIG. 1 for carrying the integral thin-film magnetic head thereon.
Figure 3:
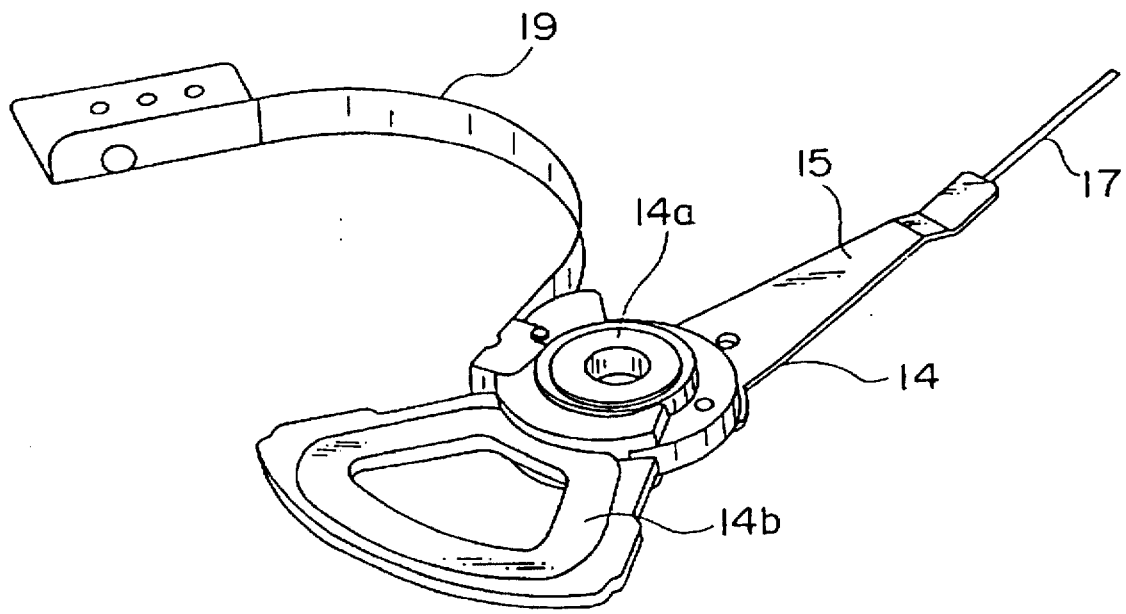
FIG. 3 is a diagram showing an arm assembly that is used in the magnetic disk storage device of FIG. 1.
Figure 4:
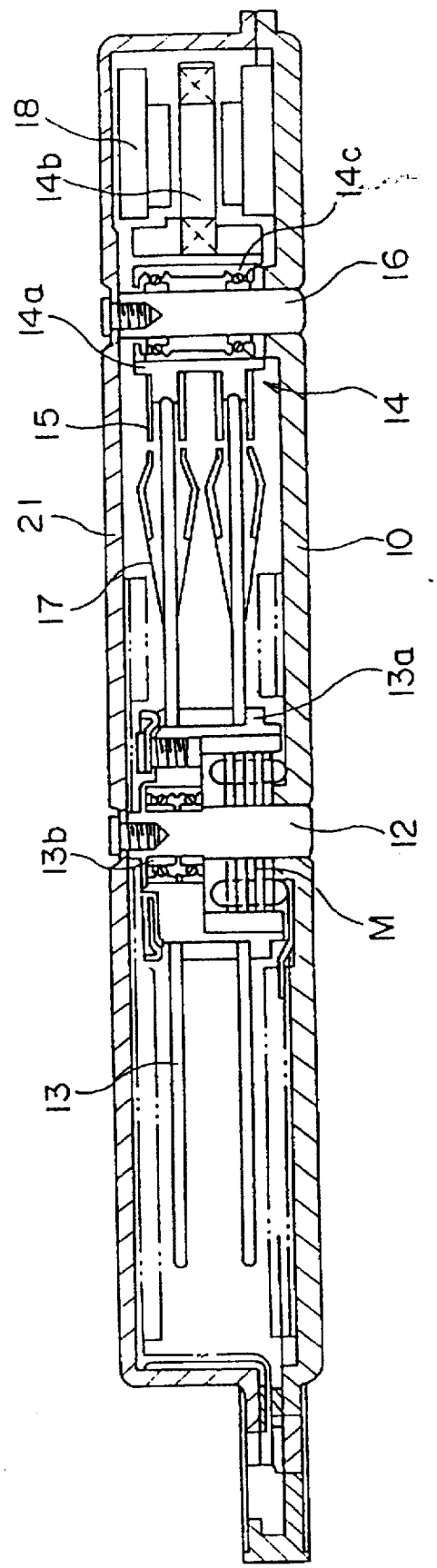
FIG. 4 is a diagram showing the magnetic disk storage device of FIG. 1 in a cross sectional view.
Figure 6:
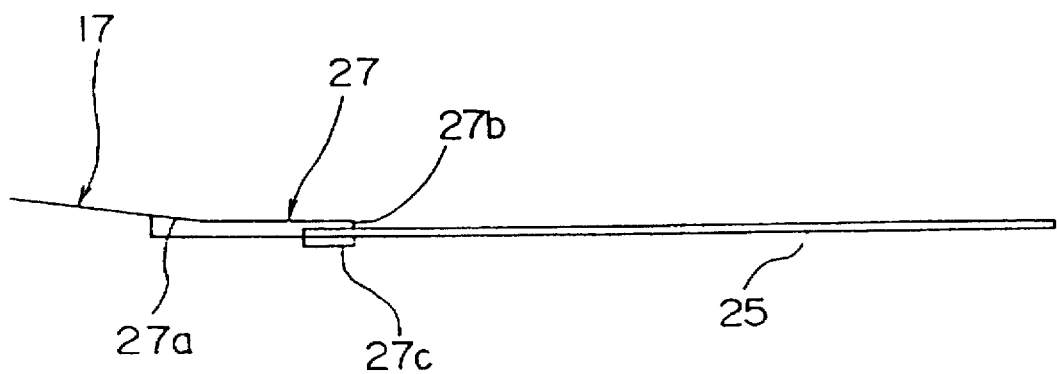
FIG. 6 is a diagram showing the swing arm of FIG. 5 in a side view.
Figure 7:
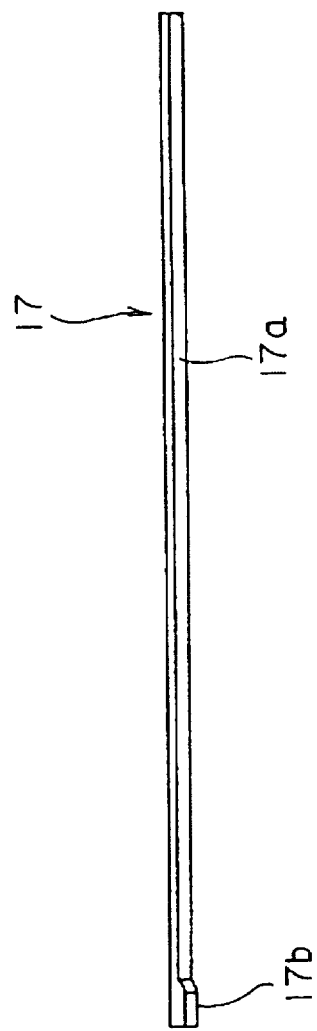
FIG. 7 is a diagram showing the integral thin-film magnetic head in an enlarged scale.
Figure 8:
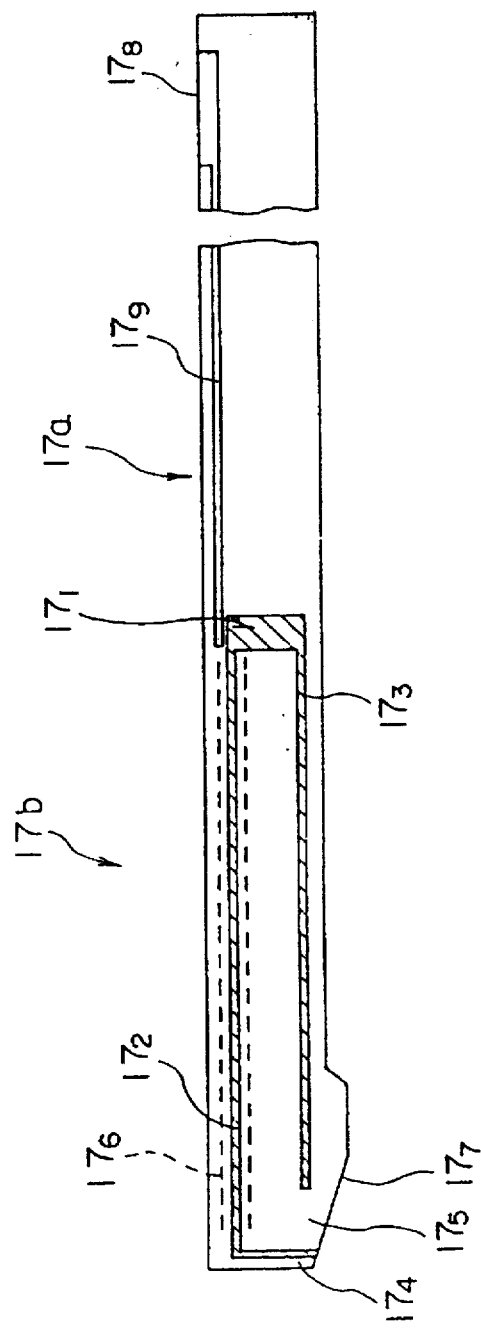
FIG. 8 is a diagram showing the structure of the integral thin-film magnetic head of FIG. 7 in a cross sectional view.
Figure 9:
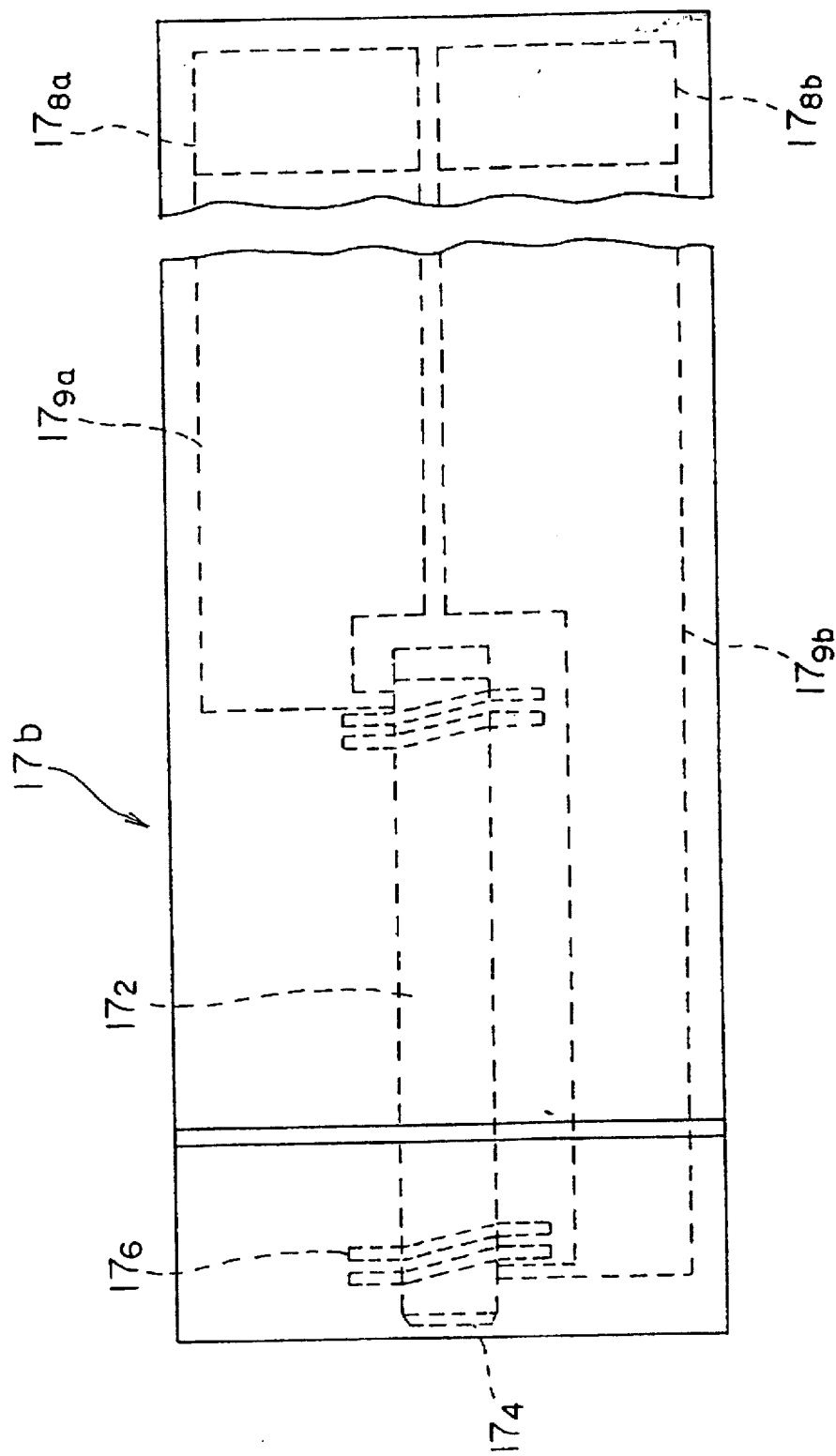
FIG. 9 is a diagram showing the magnetic head of FIG. 7 in a plan view.
Figure 14:
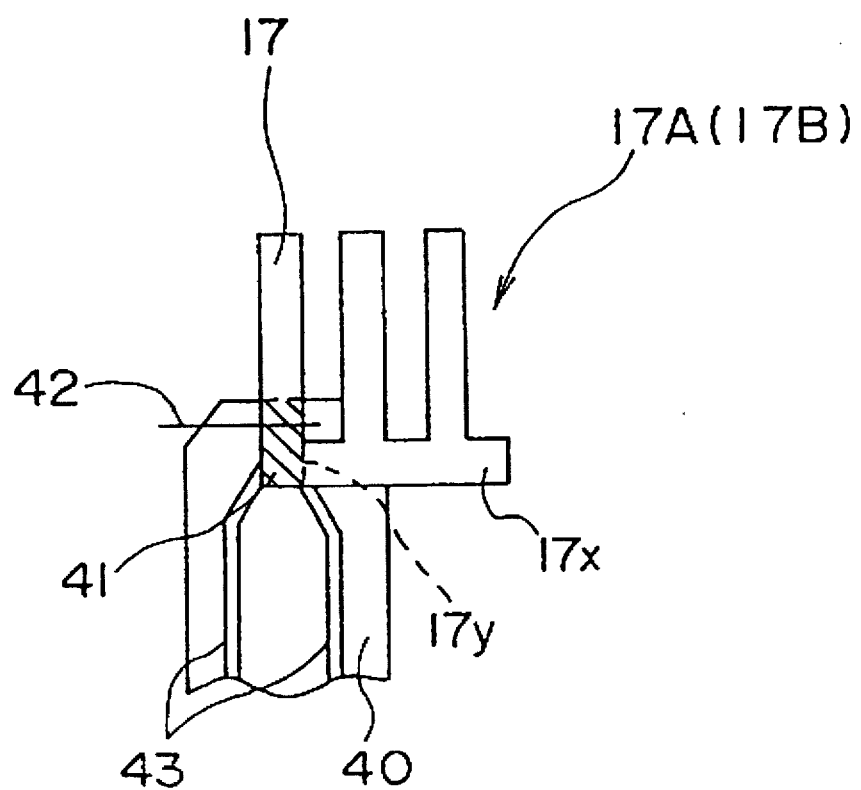
FIG. 14 is a diagram showing the fabrication of the integral thin-film magnetic head according to a second embodiment of the present invention.

FIG. 14 shows the process for mounting the individual needle-like magnetic head 17 either directly on a swing arm as in the example of FIG. 2 or on the arm via an intermediate member as in the example of FIG. 6, wherein the member on which the magnetic head 17 is mounted directly is designated in FIG. 14 by a reference numeral 40. There, the comb-shaped member 17A or 17B is attached on the member 40 by an adhesive in correspondence to a hatched region 41 and is held firmly by a mechanical device such as a clip 42. The comb-shaped member 17A or 17B is attached such that the terminal pads $17_{8a}$ and $17_{8b}$ establish a contact with corresponding conductor patterns 43 that may be printed on the upper major surface of the member 40. Further, the comb-shaped member 17A is broken in correspondence to the base part $17_x$ along a broken line $17_y$, by applying a force against the part of the member 17A or 17B that is not fixed upon the member 40. It should be noted that the base part $17_x$ that connects the magnetic heads 17 is formed of $Al_2O_3$ alone and can be broken easily.

After the magnetic head 17 is thus attached and separated, the comb-shaped member 17A or 17B that carries the rest of the magnetic heads 17 is attached on a next member 40 similarly as before, and the magnetic head is separated from the rest of the comb-shaped member by breaking after gluing and mechanical fixing by the clip. Thereby, it is advantageous to remove the unnecessary laterally-extending part $17_x$ that extends between one magnetic head 17 and the next magnetic head 17, prior to the mounting upon the member 40. Such a process can be achieved by applying a blade to cut off the unnecessary part.

Figure 5:
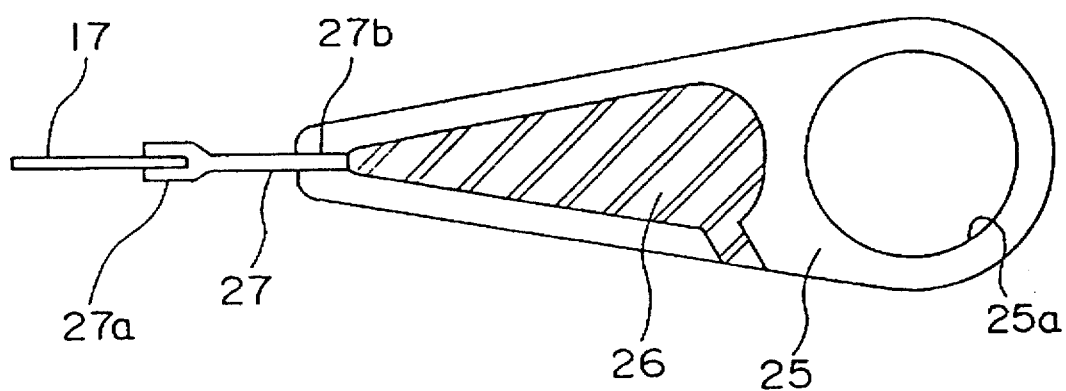
FIG. 5 is a diagram showing another example of the swing arm used in the device of FIG. 1.

As already noted, the member 40 may be a part of the magnetic head 15 as shown in FIG. 2 or the intermediate member 27 shown in FIG. 5. In the latter case, the intermediate member 27 thus carrying the magnetic head 17 thereon is attached to the arm 25.

Figure 15A:
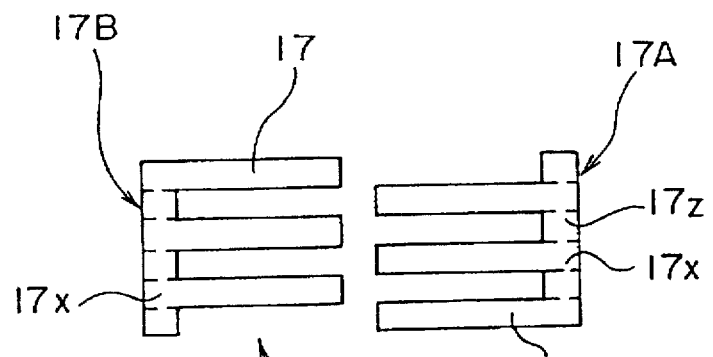
FIGS. 15(A) and 15(B) depict another embodiment of the invention having scribed grooves.
Figure 15B:
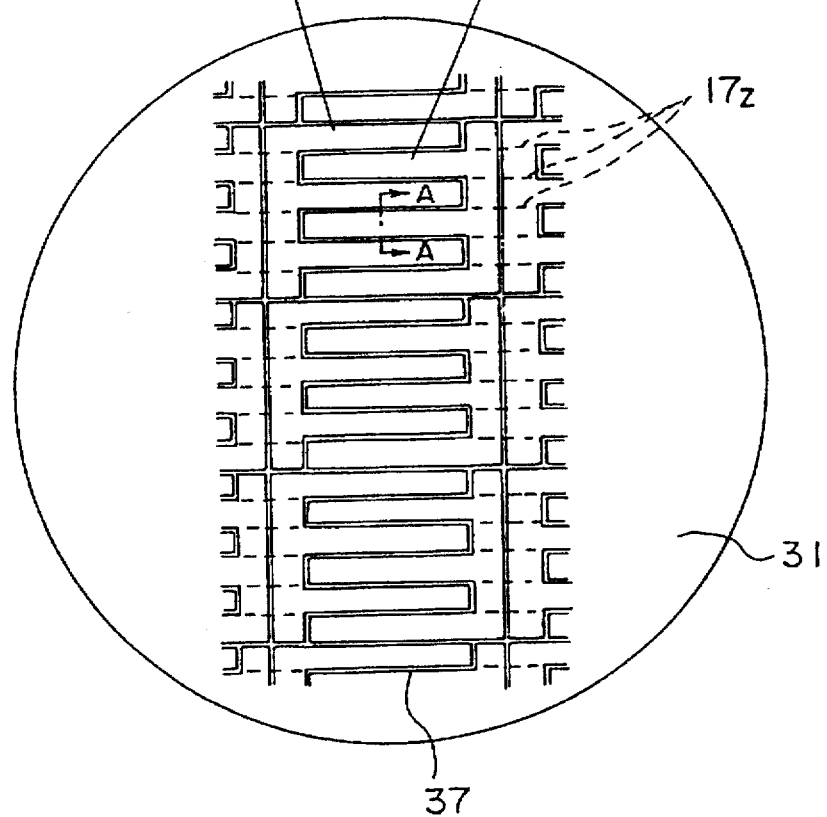

FIGS. 15(A) and 15(B) show a second embodiment of the present invention, wherein it will be noted that the substrate 31 is formed with a number of parallel grooves $17_z$ that are formed by scribing the surface of the substrate 31 by a saw with a limited depth. Thereby, each groove $17_z$ is formed coincident to the straight portion of the Cu strip 37 extending along the elongated magnetic head, and the grooves $17_z$ thus formed remain on the comb-shaped members 17A and 17B after they are separated as a result of the etching shown in FIG. 15(A).

Figure 16:
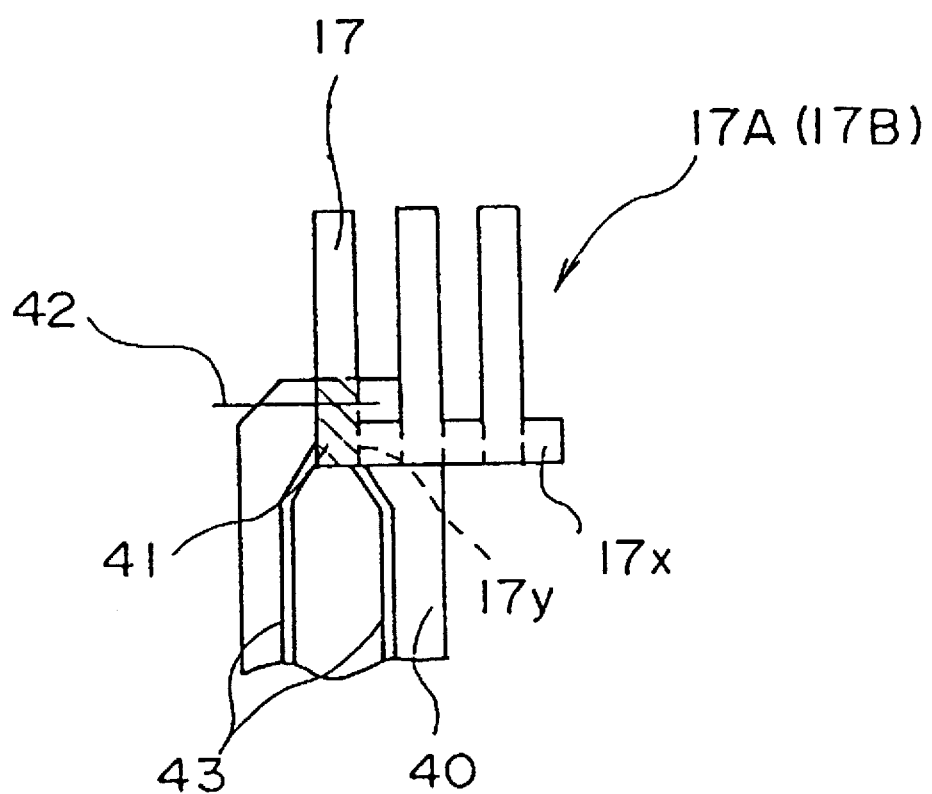
FIG. 16 generally depicts a mounted magnetic head formed as shown in FIGS. 15 (A) and 15 (B)

The process for attaching the elongated magnetic head 17 on the member 40 is conducted similarly to the previous embodiment as shown in FIG. 16 except for the point that the process for breaking the comb-shaped member 17A or 17B is achieved by using the grooves $17_z$ as a strain line. Thereby, the process for breaking the comb-shaped member into individual magnetic heads 17 and the process for mounting the individual magnetic heads 17 on the support member 40 are achieved simultaneously and with reliability.

Further, the present invention is not limited to the embodiments described heretofore, but various variations and modifications may be made without departing from the scope of the invention.

What is claimed is:

1. A thin-film magnetic head sub-assembly for attachment to one or more magnetic disk drive head arm assemblies, comprising:

a plurality of elongated thin film magnetic head members each extending in parallel in a common direction from respective head ends into a thin film magnetic base member, portions thereof respectively forming opposite base ends of the magnetic head members, each of said elongated magnetic head members integrally carrying a magnetic head at said head end, each magnetic head member having a length that substantially exceeds any of a width and a height of said magnetic head; and said base member further including laterally extending portions connecting and disposed between said base ends of said plurality of elongated magnetic head members prior to attachment to one or more magnetic disk drives, said base ends of said plurality of elongated magnetic head members being separable from adjacent laterally extending portions of said base member so that each of said magnetic heads, including base ends thereof, is separable from each other for attachment to one or more magnetic disk drive head arm assemblies, wherein spaces are disposed between said head members connected by said laterally extending portions, said spaces extend from said head ends to said laterally extending portions, and said spaces have a greater width than said head members.

2. A thin-film magnetic head sub-assembly corresponding to claim 1, wherein said base ends of said magnetic head members individually attach to magnetic disk drives.

3. A thin-film magnetic head sub-assembly corresponding to claim 2, wherein said base member is scribed parallel to said base ends of said head members to allow separation of said base ends of said head members from said laterally extending portions of said base member.

4. A thin-film magnetic head sub-assembly for attachment to one or more magnetic disk drive head arm assemblies, comprising:

a plurality of elongated integral type thin film magnetic head members each extending in parallel in a common direction from respective head ends into a thin film magnetic base member, portions thereof respectively forming opposite base ends of the magnetic head members, with a length that substantially exceeds any of a width and a height of said magnetic head member, each of said elongated integral type magnetic head members carrying a magnetic head at said head end as an integral part of said member; and said base member further including laterally extending portions connecting and disposed between said base ends of said plurality of elongated integral type magnetic head members prior to attachment to one or more magnetic disk drives, said base ends of said plurality of elongated integral type magnetic head members being separable from adjacent laterally extending portions of said base member so that each of said magnetic heads, including base ends thereof, is separable from each other for attachment to one or more magnetic disk drive head arm assemblies, wherein spaces are disposed between said head members connected by said laterally extending portions, said spaces extend from said head ends to said laterally extending portions, and said spaces have a greater width than said head members.

5. A thin-fill magnetic head sub-assembly corresponding to claim 4, wherein said base ends of magnetic head members individually attach to said disk drives.

6. A thin-fill magnetic head sub-assembly corresponding to claim 5, wherein said base member is scribed parallel to said base ends of said head members to allow separation of said base ends of said head members from said laterally extending portions of said base member.

7. A thin-film magnetic head sub-assembly for attachment to one or more magnetic disk drive head arm assemblies, comprising:

a plurality of elongated thin film magnetic head members each extending in parallel in a common direction from respective head ends into a magnetic thin film base member, portions thereof respectively forming opposite base ends of said magnetic head members, each of said elongated magnetic head members carrying a magnetic head at said head end, each magnetic head member having a length that substantially exceeds any of a width and a height of said magnetic head;

said base member further comprising laterally extending portions connecting and disposed between said base ends of said plurality of magnetic head members, said base ends of said plurality of elongated magnetic head members being separable from adjacent laterally extending portions of said base member so that each of said magnetic heads, including base ends thereof, is separable from each other for attachment to one or more magnetic disk drive head arm assemblies;

said magnetic head members and said base member being co-planar wherein spaces are disposed between adjacent ones of said head members connected by said laterally extending portions, said spaces extend from said head ends to said laterally extending portions, and said spaces have a greater width than said head members.

8. A thin-film magnetic head sub-assembly according to claim 7, wherein said magnetic head members and said base member are formed within a single magnetic substrate.

9. A thin film magnetic head sub-assembly, for attachment to one or more magnetic disk drive head arm assemblies, removably integrally formed in a planar magnetic substrate, the thin film magnetic head sub-assembly comprising:

a comb shaped integral structure formed as part of the magnetic substrate including a base member and a plurality of elongated head members each extending in parallel in a common direction into base end portions of said base member which form base ends of said head members, said base end portions of said head members being connected to each other by laterally extending portions of said base member disposed between said base end portions, said head members each carrying a magnetic head at a head end thereof opposite said base member said base ends of said plurality of elongated magnetic head members being separable from adjacent laterally extending portions of said base member so that each of said magnetic heads, including base ends thereof, is separable from each other for attachment to one or more magnetic disk drive head arm assemblies, wherein spaces are disposed between adjacent ones of said head members connected by said laterally extending portions, said spaces extend from said head ends to said laterally extending portions, and said spaces have a greater width than said head members.

10. A planar magnetic substrate integrally removably including a thin film magnetic head sub-assembly for attachment to one or more magnetic disk drives, the substrate comprising:

a plurality of elongated magnetic head members extending into a base member having base end portions which form base ends of the magnetic head members and laterally extending portions disposed between and connecting said base end portions to form the magnetic head assembly said base ends of said plurality of elongated magnetic head members being separable from adjacent laterally extending portions of said base member so that each of said magnetic heads, including base ends thereof, is separable from each other for attachment to one or more magnetic disk drive head arm assemblies, after removal from said substrate; and an etchable material surrounding said thin film magnetic head assembly, wherein spaces are disposed between adjacent ones of said head members connected by said laterally extending portions, said spaces extend from said head ends to said laterally extending portions, and said spaces have a greater width than said head members.

* * * * *

UNITED STATES PATENT AND TRADEMARK OFFICE
CERTIFICATE OF CORRECTION

PATENT NO. : 5,666,240
DATED : September 9, 1997
INVENTOR(S) : Kozaki

Page 1 of 3

It is certified that error appears in the above-identified patent and that said Letters Patent is hereby corrected as shown below:

On the title page;

Under "[57] Abstract", line 13, delete

"Second" and insert --second-- therefor

Column 2, line, 54, delete "One" and insert

--one-- therefor

Column 2, line 63, delete "25" and insert

--27-- therefor

Column 2, line 65, delete "25" and insert

--27-- therefor

UNITED STATES PATENT AND TRADEMARK OFFICE
CERTIFICATE OF CORRECTION

PATENT NO. : 5,666,240
DATED : September 9, 1997
INVENTOR(S) : Kozaki

It is certified that error appears in the above-identified patent and that said Letters Patent is hereby corrected as shown below:

Column 4, line 9, delete "11" and insert --17-- therefor

Column 4, line 11, delete "64" and insert --34-- therefor

Column 4, line 13, delete "64" and insert --34-- therefor

Column 5, line 29, delete "an" and insert --a-- therefor

Column 7, line 47, after "15(B);" delete "and"

UNITED STATES PATENT AND TRADEMARK OFFICE
CERTIFICATE OF CORRECTION

PATENT NO. : 5,666,240
DATED : September 9, 1997
INVENTOR(S) : Kozaki

It is certified that error appears in the above-identified patent and that said Letters Patent is hereby corrected as shown below:

Column 8, line 13, after "meshing" insert

--with--

Column 10, line 33, delete "thin-fill" and insert --thin-film-- therefor

Column 10, line 36, delete "thin-fill" and insert --thin-film-- therefor

Signed and Sealed this

Seventeenth Day of November, 1998

BRUCE LEHMAN

Attest:

Attesting Officer

Commissioner of Patents and Trademarks